(12) United States Patent
Corazza et al.

(10) Patent No.: US 9,339,959 B2
(45) Date of Patent: May 17, 2016

(54) NOZZLE TERMINAL FOR INJECTION MOLDING OF PLASTIC MATERIAL

(71) Applicant: INGLASS S.p.A., San Polo di Piave (Treviso) (IT)

(72) Inventors: Alberto Corazza, Treviso (IT); Fabio Bordignon, Treviso (IT); Massimo Rossi, Treviso (IT)

(73) Assignee: INGLASS S.P.A., San Polo di Piave (Treviso) (IT)

( * ) Notice: Subject to any disclaimer, the term of this patent is extended or adjusted under 35 U.S.C. 154(b) by 0 days.

(21) Appl. No.: 14/630,984

(22) Filed: Feb. 25, 2015

(65) Prior Publication Data
US 2015/0246471 A1 Sep. 3, 2015

(30) Foreign Application Priority Data
Mar. 3, 2014 (IT) .............................. TO2014A0170

(51) Int. Cl.
- *B29C 45/23* (2006.01)
- *B29C 45/20* (2006.01)
- *B29C 45/27* (2006.01)
- B29L 31/00 (2006.01)
- *B29C 45/28* (2006.01)

(52) U.S. Cl.
CPC .............. *B29C 45/20* (2013.01); *B29C 45/278* (2013.01); *B29C 45/2806* (2013.01); *B29C 2045/2787* (2013.01); *B29L 2031/757* (2013.01)

(58) Field of Classification Search
CPC .................................................... B29C 45/2806
USPC .................................. 425/549, 562, 564, 566
See application file for complete search history.

(56) References Cited

U.S. PATENT DOCUMENTS

| | | | |
|---|---|---|---|
| 2004/0109916 A1* | 6/2004 | Babin | ................ B29C 45/1603 425/572 |
| 2005/0257367 A1 | 11/2005 | Cirri et al. | |
| 2009/0148550 A1 | 6/2009 | Mohammed | |

FOREIGN PATENT DOCUMENTS

| | | |
|---|---|---|
| CA | 2305053 A1 | 10/2001 |
| WO | 0046008 A1 | 8/2000 |

OTHER PUBLICATIONS

Italian Search Report and Written Opinion for Italian Application No. ITTO20140170 mailed Mar. 3, 2014.

* cited by examiner

*Primary Examiner* — Tim Heitbrink
(74) *Attorney, Agent, or Firm* — Remarck Law Group PLC

(57) ABSTRACT

A nozzle terminal for injectors of injection molding apparatus of plastic materials, includes an inner tubular body or tip defining a flow passage for injected plastic material, and an outer ring coaxial with the tip. The tip includes a radially inner element made of a first material and a radially outer element made of a second material, and arranged in contact with a substantial axial portion of the radially inner element up to the distal end thereof, and mechanically coupled thereto.

12 Claims, 4 Drawing Sheets

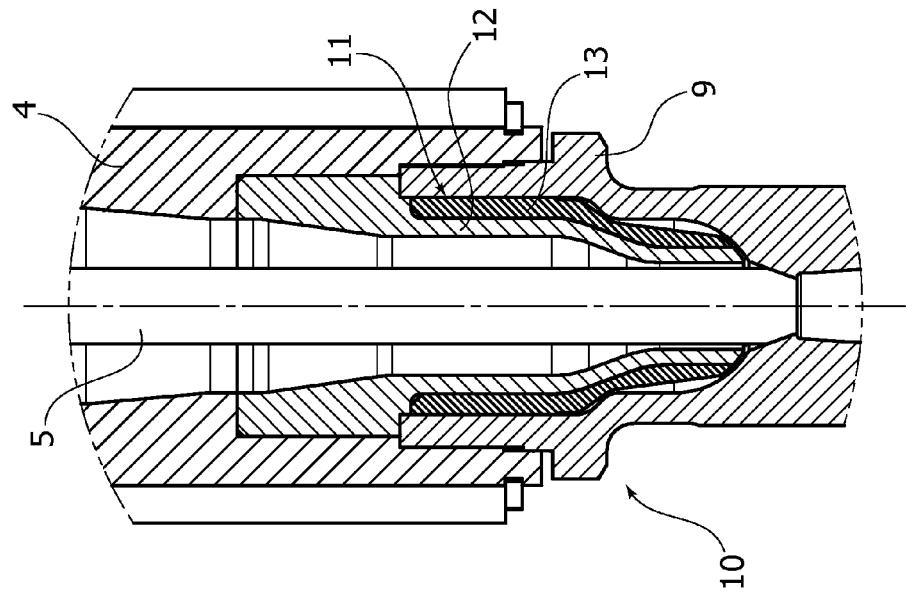
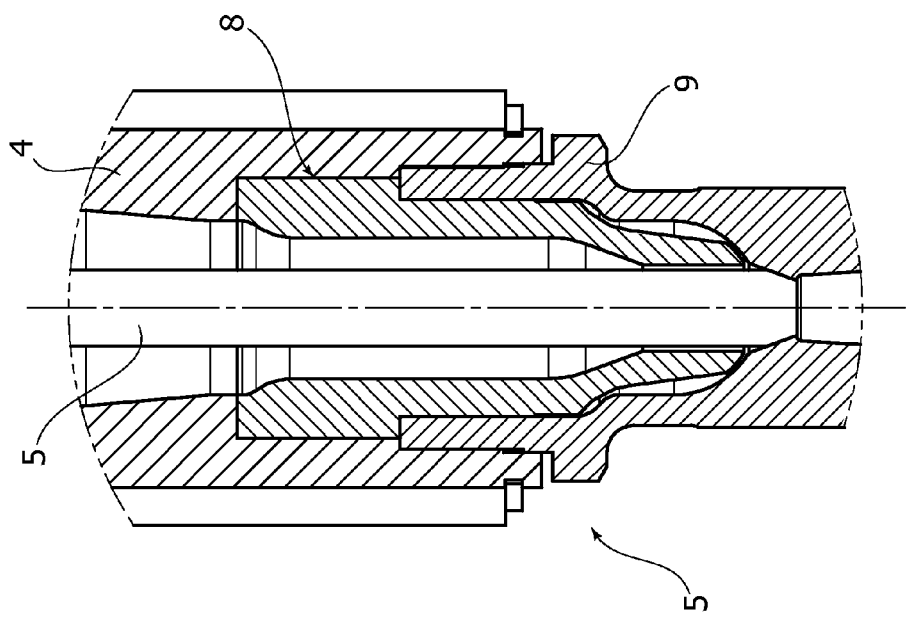

NOZZLE TERMINAL FOR INJECTION MOLDING OF PLASTIC MATERIAL

CROSS REFERENCE TO RELATED APPLICATIONS

This application claims priority to Italian Patent Application No. TO2014A000170 filed on Mar. 3, 2014, the entire disclosure of which is incorporated herein by reference.

FIELD OF THE INVENTION

The present invention relates, in general, to injectors of injection molding apparatus of plastic material. More particularly, the invention relates to a nozzle terminal for such injectors comprising an inner tubular body or tip defining a flow passage for the injected plastic material, and an outer ring coaxial to the tip.

STATE OF THE PRIOR ART

Nozzle terminals of this type are known, for example, from the documents U.S. Pat. No. 5,299,928, U.S. Pat. No. 6,988,883 and WO-2006/123237. Typically, the inner tubular body or tip is of a material with high thermal conductivity while the outer ring, intended, during use, to be in contact with a cooled mold, is of a material with low thermal conductivity so as to reduce heat losses.

The need to ensure high thermal conductivity of the tip limits the choice for its composition materials, such as, for example, copper and its alloys, which have, conversely, a modest resistance to abrasion and chemical agents of the plastic materials that pass through it during injection.

From the document U.S. Pat. No. 7,182,591, a nozzle terminal is also known of the type defined above, whose tip is formed by two axial portions, soldered together, corresponding respectively to the proximal end and the distal end of the tip itself. Both portions are made of the same material with high thermal conductivity, so that not even this configuration is able to solve the technical problem stated above.

From the document US-2009/148550A1, a nozzle terminal is known corresponding to the pre-characterizing part of claim 1, whose tip includes a radially inner element of a first material and a radially outer element of a second material arranged in contact with a substantial axial portion of the radially inner element, up to its distal end. The radially inner and outer elements of the tip are coupled to each other via multiple systems, none of which is, however, able to guarantee stable mutual fixing that is both axial and angular, at the same time ensuring easy removal for any maintenance operations.

SUMMARY OF THE INVENTION

The object of the present invention is to provide a functional and effective solution to the problem mentioned above, and this object is achieved thanks to the fact that one of said radially inner and outer elements has at least one hooking tooth engaged within a seat of the other of said radially outer and inner elements.

Thanks to this solution idea, the radially inner element of the tip, to which the radially outer element is mechanically connected to and which is in contact with the flow of injected plastic material, can be made of a material with high mechanical resistance, high resistance to abrasion and high resistance to chemical agents of the plastic material. Typically, this material may consist of hardened stainless steel (50-52 HRC), or of non-stainless steel or tungsten. Conversely, the second material with which the radially outer element is formed, which externally wraps around the radially inner element and is not in direct contact with the injected plastic material, nor must it fulfill any mechanical function, can be selected from a wide range, starting from materials with very high thermal conductivity, such as electrolytic copper (390 W/mK) to more insulating materials, such as titanium (6.7 W/mK). In this way, it is possible to define a univocal relationship between the molded plastic material, the configuration of the injection opening ("gate") of the mold and the thermal conductivity needed to obtain the best performance and therefore the best quality of the molded parts.

In other words, it is possible to select, for each of the two radially inner and outer elements of the tip, the most suitable respective materials, and their combinations, according to the characteristics of the plastic material to be molded, the type of the mold and the configuration of the nozzle terminal (valve-type, free-flowing or torpedo-type).

The mechanical coupling between the radially inner and outer elements of the tip ensures a safe and reliable securing of the radially outer element relative to the radially inner element, keeping the relative axial and angular positioning fixed, while ensuring, at the same time, ease of disassembly of the tip as a whole, together with the outer ring of the nozzle terminal, for possible maintenance operations, without the risk of damage to the radially outer element.

With the object of increasing the efficiency of thermal conduction, the coupling between the radially inner and outer elements of the tip of the nozzle terminal, is also conveniently made by interference, which further reduces the risk that the radially outer element can be separated from the radially inner element during disassembly of the tip for maintenance of the injector. A mechanical coupling can also be provided between the radially outer element of the tip and the ring of the nozzle terminal.

The radially outer element of the tip can also be made directly on the radially inner element by means of powder deposition through Cold Spray or Thermal Spraying techniques such as Plasma coating, Flame coating, or High Velocity oxy-fuel spraying (HVOF). These processes allow the outer component to be created directly on the inner one, welding them to each other without additional auxiliary mechanical connections. Obviously, in this case, the complete tip must be reworked to achieve the desired finished size.

BRIEF DESCRIPTION OF THE DRAWINGS

The invention will now be described in detail with reference to the attached drawings, provided purely by way of non-limiting example, in which:

FIG. 2 is a partial enlarged view of the conventional nozzle terminal;

FIG. 3 is an analogous view to FIG. 2 which exemplifies an embodiment of the nozzle terminal according to the invention;

DETAILED DESCRIPTION OF THE INVENTION

Figure 1:
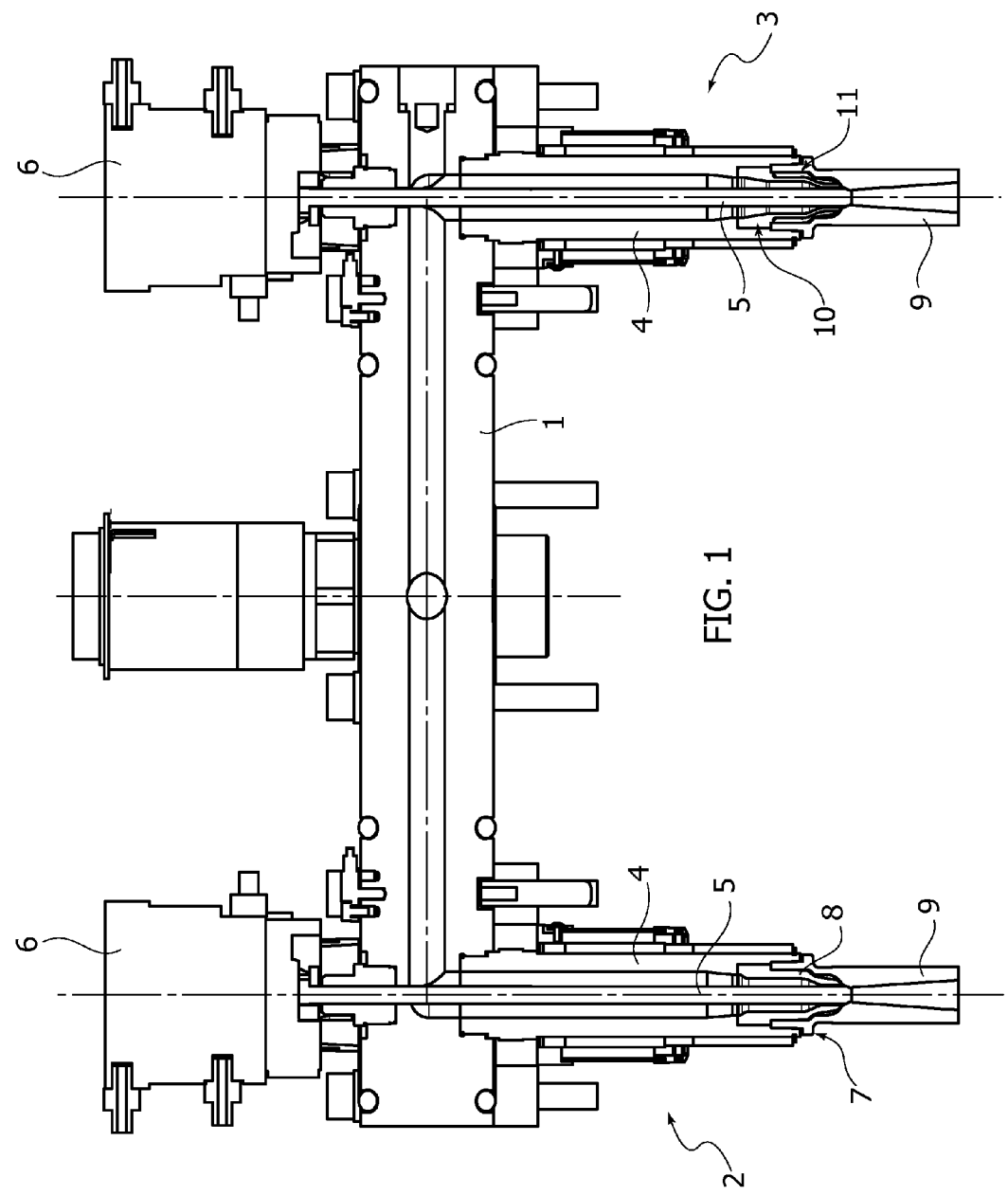
FIG. 1 is a schematic partial vertical cross-sectional view of an apparatus for injection molding equipped, by way of example, with two injectors with nozzle terminals, respectively conventional and according to the invention.

Referring initially to FIG. 1, an apparatus for injection molding of plastic materials comprises, in a conventional manner, a hot chamber 1 to which the plastic material to be injected in the fluid state is fed under pressure, in the case of the illustrated example via two injectors 2, 3, in this case of the valve-type. Still in a conventional way, each injector 2, 3 comprises a nozzle body 4 in communication with the hot chamber 1 and along which a pin valve 5 is axially movable, controlled by a fluid or electric actuator 6.

The lower end of the pin valve 5 cooperates with a nozzle terminal, which will be described, to open or close the flow of the plastic material towards the injection passage ("gate") of a mold.

The injector 2 is equipped with a conventional nozzle terminal, or rather according to the prior art, indicated by the reference 7 and illustrated in greater detail in FIG. 2. It comprises an inner tubular body 8, known as a tip and formed by a single piece of material with high thermal conductivity (typically copper or its alloys), and an outer hollow element 9 of a material with lower thermal conductivity, referred to as the ring. The ring 9 protrudes below the tip 8, coupling in a sealable manner, at its free end, with a mold, at the relative injection passage.

Figure 5:
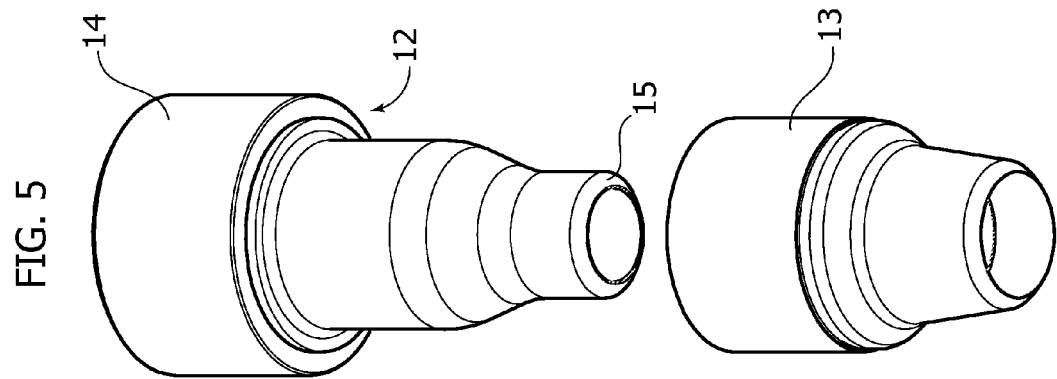
FIG. 5 is an exploded perspective view of FIG. 4.
Figure 4:
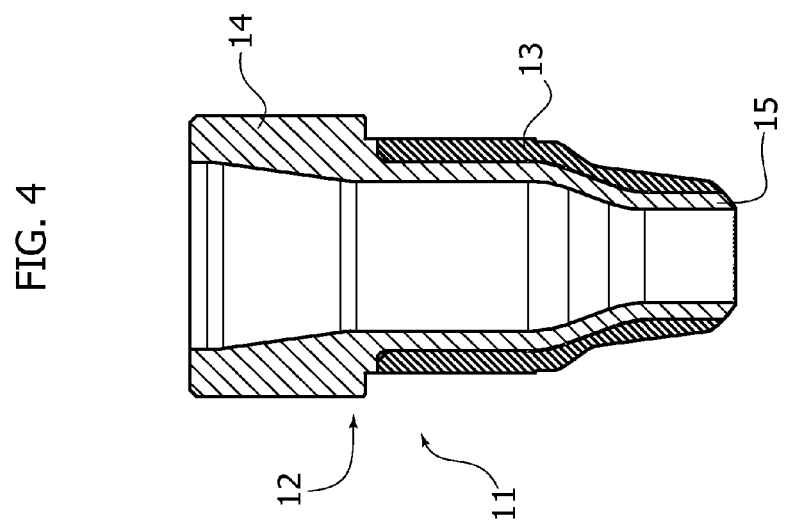
FIG. 4 is an analogous view to FIG. 3 which only shows the inner tubular body or tip of the nozzle terminal of FIG. 3.

The injector 3 represented on the right side of FIG. 1 is instead equipped with a nozzle terminal according to the invention, indicated as a whole by 10, and represented in greater detail in FIGS. 3 to 5. In this case as well it comprises the outer ring 9, essentially analogous to that according to the prior art, and an inner tubular body or tip indicated by 11, which is instead formed in a unique way of two components. A first component consists of a radially inner element 12, essentially analogous to the tip 8 of the nozzle terminal 7 according to the prior art and made of a first material, and a second component, which consists of a radially outer element 13 made of a second material different from the first.

The radially inner element 12 has a proximal end 14, inserted and locked inside the nozzle 4, and a distal end 15 that protrudes outside the nozzle 4 and which cooperates with the lower end of the pin valve 5.

The portion of the radially inner element 12, corresponding to the proximal end 14, typically has a greater thickness, while the remaining part up to the distal end 15 has a reduced thickness, for example, constant.

The radially outer element 13 surrounds and externally wraps around the radially inner element 12 coaxially, below the proximal end 14 thereof, up to the distal end 15. Therefore, while the radially inner element 12, during injection, is in contact with the flow of the plastic material injected into the mold, the radially outer element 13 is never in contact with it. This enables the two elements 12 and 13 to be produced with different materials, which can be selected and combined according to the characteristics of the plastic material to be injected, the type of "gate" of the mold and the configuration of the nozzle terminal 11: of the valve-type, as in the case of the illustrated example, or free-flowing or torpedo-type.

Thus, the radially inner element 12 which must resist wear and oxidation by the plastic material is made of a first material having high mechanical resistance, high resistance to abrasion and high resistance to chemical agents. This first material may be selected from hardened or tempered stainless steel, equipped, however, with a very low thermal conductivity (16 W/mK), or with hardened or tempered non-stainless steel, which has a superior resistance to wear and also a greater conductivity (32 W/mK), or with tungsten, which has an even higher conductivity, in the order of 80 W/mK.

The radially outer element 13 is instead made of a second material, which can be selected from a wide range: those of low thermal conductivity, such as titanium (4 W/mK), or of higher conductivity, such as steel (16-36 W/mK), tungsten (80 W/mK), copper and nickel alloys (60-140 W/mK), molybdenum alloys, such as TZM (120 W/mK), copper and beryllium alloys (120-300 W/mK), aluminium (260 W/mK), electrolytic copper (300-390 W/mK) and also graphite (60-400 W/mK).

As already said, the choice and the combination of the first and second materials are applied according to the type of plastic material to be injected and the configuration of the injection point "gate". For example, regarding the characteristics of the plastic material, crystalline materials generally have a "cold cap" problem, or freezing at the point of injection, which sometimes prevents molding or may require an increase of the temperature for the restarts. The crystalline materials therefore generally require a high temperature of the tip 11, and a highly conductive material for the radially outer element 13 is therefore preferable.

Instead, amorphous plastic material often behaves in a different way according to the type of configuration of the tip or the "gate". For example, in the case of valve nozzles, these amorphous materials require high temperature to flow better and to avoid filaments, particularly in the case of direct injection of the figures, while in the case of free-flow, a lower temperature of the tip is required to avoid problems of "stringing" (the formation of a plastic thread that remains between the molded part and the nozzle, when the mold is open during extraction of the piece, which is difficult to remove completely and may remain trapped in the mold during the successive injection cycle) or of "drooling" from the "gate" (or rather, of dripping of plastic material that generates aesthetic defects of the molded pieces close to the "gate", or even the inability to mold because the droplet cools, blocking the "gate").

The semi-crystalline plastic materials generally behave in an intermediate manner.

Even the conformation of the ring 9 of the nozzle terminal 10 can influence the behavior of the plastic material on the "gate" of the mold: for example, a "pass-through end ring" (in the figures) involves a generally hotter "gate" relative to the case of an outer ring ("blind seat") since, in the latter, the "gate" formed on the mold is notoriously colder. It may then generate the defects described above.

Figure 6:
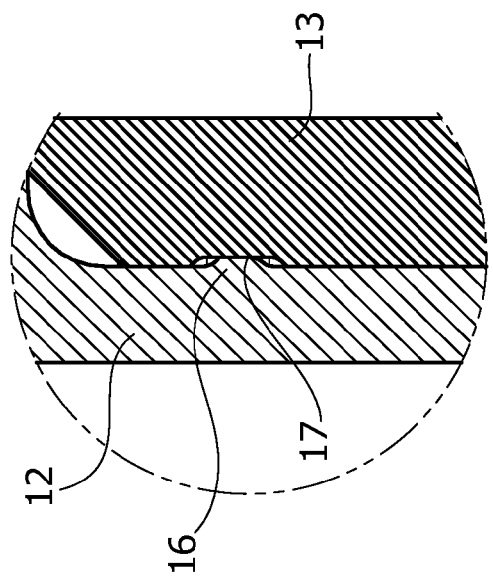
FIGS. 6 and 7 show two enlarged details of FIG. 3.

The coupling between the radially inner element 12 and the radially outer element 13 of the tip 11 is produced by interference and, according to the unique characteristic of the invention, also with the aid of a mechanical retention, for example, of the type illustrated in greater detail in the component of FIG. 6: at least one tooth 16 projecting radially from the outer surface of the radially inner element 12 and engaged within a complementary seat 17 of the radially outer element 13. Of course, the arrangement of the tooth 16 and seat 17 may be reversed.

Alternatively, the radially outer element 13 of the tip 11 can be produced, instead of as a separate component and then fitted onto the radially inner element 12, directly thereon by means of powder deposition through Cold Spray or Thermal Spraying techniques such as Plasma coating, Flame coating, or High Velocity oxy-fuel spraying (HVOF). These processes allow soldering of the outer component 13 directly on the inner component 12 without additional auxiliary mechanical connections. The tip 11 thus produced will then be reworked to obtain the desired finished size.

Figure 7:
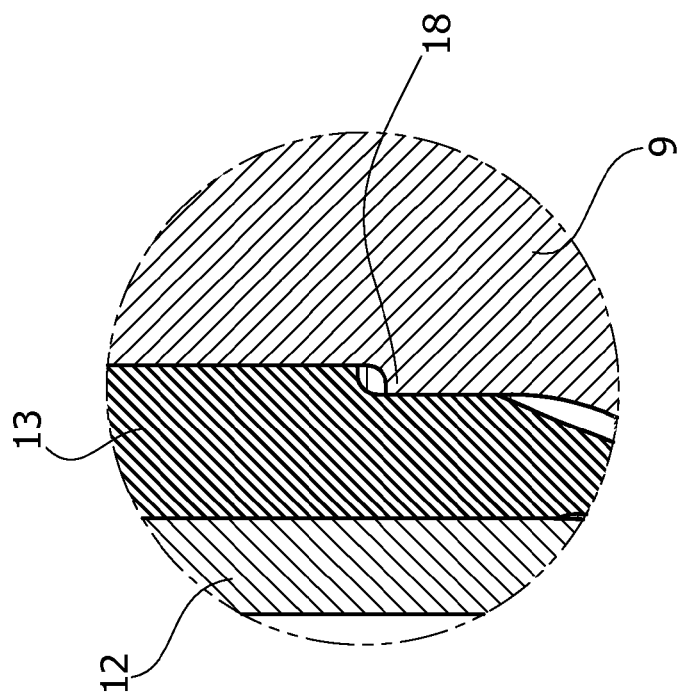

The outer ring 9, which is typically made of a material with low conductivity and therefore more insulating, such as titanium or steel, is coupled to the radially outer element 13 of the tip 11, also in this case by interference and with the possible aid of mechanical retention, for example by means of at least one hooking tooth indicated with 18 in the detail of FIG. 7.

Of course, the details of construction and the embodiments may be widely varied with respect to those described and illustrated, without departing from the scope of the present invention as defined by the following claims.

The invention claimed is:

1. A nozzle terminal for injection molding of plastic materials, comprising an inner tubular body or tip defining a flow passage for injected plastic material and having a proximal end and a distal end, and an outer ring coaxial with the tip, wherein the tip of the nozzle terminal includes a radially inner element made of a first material and a radially outer element made of a second material and arranged in contact with a substantial axial portion of said radially inner element up to the distal end thereof, wherein one of said radially inner and outer elements has at least one hooking tooth in the form of a radially extending projection engaged within a seat in the form of a recess provided in a mating surface of the other of said radially outer and radially inner elements to mechanically couple the radially inner element to the radially outer element, and wherein the outer ring includes a hooking tooth configured to mechanically couple the outer ring to an outer surface of the radially outer element.

2. The nozzle terminal according to claim 1, wherein said radially inner and outer elements of the tip are also coupled to each other by interference.

3. The nozzle terminal according to claim 1, wherein said radially outer element of the tip is formed on the radially inner element by powder deposition through cold spray or thermal spraying techniques.

4. The nozzle terminal according to claim 1, wherein said first and second material are selected according to characteristics of the plastic material to be injected, a typology of the injection mold and a configuration of the nozzle terminal.

5. The nozzle terminal according to claim 4, wherein said first material has a high mechanical resistance, high resistance to abrasion and high resistance to chemical agents.

6. The nozzle terminal according to claim 5, wherein said first material is selected from hardened stainless steel, non-stainless steel and tungsten.

7. The nozzle terminal according to claim 4, wherein said second material is selected from materials with high or low thermal conductivity.

8. The nozzle terminal according to claim 7, wherein said second material is selected from titanium, steel, copper, copper and beryllium alloys, copper and nickel alloys, aluminum and graphite.

9. The nozzle terminal according to claim 2, wherein said radially outer element of the tip is also coupled by interference with said outer ring.

10. The nozzle terminal according to claim 2, wherein the mating surface is an inner surface of the radially outer element that is in contact with the outer surface of the radially inner element, and wherein the radially extending projection projects radially from the outer surface of the radially inner element and engages the recess to mechanically couple the radially inner element to the radially outer element.

11. The nozzle terminal according to claim 3, wherein the cold spray or thermal spraying techniques include plasma coating, flame coating, or high velocity oxy-fuel spraying (HVOF).

12. A nozzle terminal for injectors of injection molding apparatus of plastic materials, comprising an inner tubular body or tip defining a flow passage for injected plastic material and having a proximal end and a distal end, and an outer ring coaxial with the tip, wherein the tip of the nozzle terminal includes a radially inner element made of a first material and a radially outer element made of a second material and arranged in contact with a substantial axial portion of said radially inner element up to the distal end thereof, wherein one of said radially inner and outer elements has at least one hooking tooth in the form of a radially extending projection engaged within a seat in the form of a recess provided in a mating surface of the other of said radially outer and radially inner elements to mechanically couple the radially inner element to the radially outer element.

* * * * *